United States Patent
Kimura et al.

(10) Patent No.: US 8,520,760 B2
(45) Date of Patent: Aug. 27, 2013

(54) RADIO RECEPTION DEVICE, RADIO TRANSMISSION DEVICE, AND FEEDBACK METHOD

(75) Inventors: Ryohei Kimura, Tokyo (JP); Daichi Imamura, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/988,251

(22) PCT Filed: Apr. 17, 2009

(86) PCT No.: PCT/JP2009/001778
§ 371 (c)(1),
(2), (4) Date: Jan. 10, 2011

(87) PCT Pub. No.: WO2009/128276
PCT Pub. Date: Oct. 22, 2009

(65) Prior Publication Data
US 2011/0096852 A1    Apr. 28, 2011

(30) Foreign Application Priority Data

Apr. 18, 2008 (JP) .................... 2008-109294

(51) Int. Cl.
*H04B 7/02* (2006.01)
(52) U.S. Cl.
USPC ............... 375/267; 375/295; 375/316
(58) Field of Classification Search
USPC .......................... 375/267, 295, 316
See application file for complete search history.

(56) References Cited

U.S. PATENT DOCUMENTS 7,961,672 B2 * 6/2011 Varadarajan et al. ......... 370/328
2009/0279419 A1 * 11/2009 To et al. ....................... 370/208

FOREIGN PATENT DOCUMENTS

| JP | 2007-166118 | 6/2007 |
| WO | 2007/015627 | 2/2007 |

OTHER PUBLICATIONS

International Search Report dated Jun. 30, 2009.
3GPP TSG-RAN WG1 Meeting #51 bis, "Frequency-selective CQI on PUCCH," Panasonic, R1-080149, Jan. 2008, pp. 1-10.
3GPP TSG RAN WG1 #46-bis, "Analysis on DCT based CQI reporting Scheme," LG Electronics, R1-062954, Oct. 2006, pp. 1-14. p. 2, Line 6.

* cited by examiner

*Primary Examiner* — Juan A Torres
(74) *Attorney, Agent, or Firm* — Dickinson Wright PLLC

(57) ABSTRACT

Provided are a radio reception device, a radio transmission device, and a feedback method which can uniformly guarantee the feedback accuracy of an average channel quality indicator (CQI) even when the transmission band width is different. A channel estimation unit uses a pilot signal to obtain SINR for each RB. A feedback information generation unit converts SINR of each RB into a corresponding CQI. Moreover, as the transmission band width increases, the number X of the quantization bits is decreased when quantizing the average CQI, thereby generating feedback information. A radio transmission unit transmits feedback information from an antenna.

9 Claims, 10 Drawing Sheets

|  | FIRST STREAM AVERAGE CQI | SECOND STREAM DIFFERENCE | CQI1~5 |
|---|---|---|---|
| 5MHz (25RB) | 5 BITS | 3 BITS | 3 BITS |
| 10MHz (50RB) | 4 BITS | 2 BITS | 3 BITS |
| 20MHz (100RB) | 3 BITS | — | 3 BITS |
| 40MHz (200RB) | 3 BITS | — | 3 BITS |

|  | AVERAGE CQI | CQI1 | CQI2 | CQI3 | CQI4 | CQI5 |
|---|---|---|---|---|---|---|
| 5MHz (25RB) | 5 BITS | 3 BITS | 3 BITS | 3 BITS | 3 BITS | 3 BITS |
| 10MHz (50RB) | 4 BITS | 3 BITS | 3 BITS | 3 BITS | 3 BITS | 3 BITS |
| 20MHz (100RB) | 3 BITS | 3 BITS | 3 BITS | 3 BITS | 3 BITS | 3 BITS |
| 40MHz (200RB) | 3 BITS | 3 BITS | 3 BITS | 3 BITS | 3 BITS | 3 BITS |

FIG.5

|  | FIRST STREAM AVERAGE CQI | SECOND STREAM DIFFERENCE | CQI1~5 |
|---|---|---|---|
| 5MHz (25RB) | 5 BITS | 3 BITS | 3 BITS |
| 10MHz (50RB) | 4 BITS | 2 BITS | 3 BITS |
| 20MHz (100RB) | 3 BITS | — | 3 BITS |
| 40MHz (200RB) | 3 BITS | — | 3 BITS |

FIG.9

RADIO RECEPTION DEVICE, RADIO TRANSMISSION DEVICE, AND FEEDBACK METHOD

CROSS REFERENCE TO RELATED APPLICATIONS

This application is a 371 of PCT/JP2009/001778 filed Apr. 17, 2009 which is entitled to and claims the benefit of Japanese Application No. JP 2008-109294 filed Apr. 18, 2008, the disclosures of each of which, including the specification, claims, drawings and abstract, are incorporated herein by reference in their entirety.

TECHNICAL FIELD

The present invention relates to a radio reception apparatus, radio transmission apparatus and feedback method.

BACKGROUND ART

As a technology for improving cell throughput in a 3GPP (3rd Generation Partnership Project) LTE (Long Term Evolution) downlink, there is frequency scheduling (multi-user scheduling). Each terminal feeds back to the base station a CQI (Channel Quality Indicator) that is determined based on an SINR (Signal to Interference and Noise Ratio) for each group of a plurality of subcarriers (hereinafter "RB (Resource Block),") and the base station allocates communication resources to terminals using these CQI's.

The base station allocates a communication resource preferentially to a terminal that feeds back a higher CQI. Consequently, since the number of terminals that feed back a high CQI increases as the number of terminals increases, there is an improvement in cell throughput (peak data rate and frequency utilization efficiency), CQI feedback methods include Best-M reporting.

FIG. 1 shows an overview of Best-M reporting. In Best-M reporting, an average CQI (represented by X bits) of an entire transmission band ($N_{RB}$), CQI's corresponding to the top M RB's with a high CQI level (the CQI of each RB being represented by Y bits) and the positions of selected RB's (represented by $\log_2(N_{RB}C_M)$ bits) are fed back. By this means, a total of $X+YM+\log_2(N_{RB}C_M)$ bits are fed back. Number of quantization bits Y of the top M CQI's is represented by a difference value from the average CQI. Also, the average CQI is represented by fixed number of quantization bits X, regardless of the transmission band.

FIG. 2 shows the CQI feedback format in Best-M reporting. Here, a case is shown in which X=5 bits, =3 bits, and M=5. The base station demodulates Best-M reporting feedback information, and reproduces the CQI of each RB.

CITATION LIST

Non-Patent Literature

NPL 1: 3GPP, R1-062954, LG Electronics, "Analysis on DCT based CQI reporting Scheme"

SUMMARY OF INVENTION

Technical Problem

However, if a transmission bandwidth assigned to a terminal varies, the possible range (i.e. fluctuation range) of an average CQI varies too. FIG. 3 shows relationships between transmission bandwidths and the average CQI fluctuation range. FIG. 3A shows a case where the transmission bandwidth is 5 MHz (25 RB's), and FIG. 3B shows a case where the transmission bandwidth is 10 MHz (50 RB's). The average CQI fluctuation range is represented by the range indicated by dotted lines in the figures, and becomes large when the transmission bandwidth is narrower.

That is, even if the average CQI fluctuation range is large, the number of bits to represent the average CQI is limited to X bits, and, consequently, if the average CQI is quantized, the accuracy is reduced. In contrast, in a case where the average CQI fluctuation range is small, if the average CQI is quantized, the accuracy is not reduced extremely. Thus, when the transmission bandwidth varies, the average CQI fluctuation range varies, which causes a difference in the accuracy of average CQI feedback.

It is therefore an object of the present invention to provide a radio reception apparatus, radio transmission apparatus and feedback method for equally securing the accuracy of average CQI feedback even in a case where a transmission bandwidth varies.

Solution to Problem

The radio reception apparatus of the present invention employs a configuration having: a reception section that receives a pilot signal; an estimating section that estimates received quality of a received signal using the received pilot signal; a feedback information generating section that obtains an average channel quality indicator by averaging the received quality over a transmission bandwidth, and generates feedback information by quantizing the obtained average channel quality indicator by a smaller number of quantization bits when the transmission bandwidth is wider; and a transmission section that transmits the feedback information.

The radio transmission apparatus of the present invention employs a configuration having: a reception section that receives feedback information including an average channel quality indicator obtained by averaging received quality over a transmission bandwidth; and a feedback information demodulating section that demodulates the feedback information based on a smaller number of quantization bits when the transmission bandwidth is wider.

The feedback method of the present invention includes: receiving a pilot signal; estimating received quality of a received signal using the received pilot signal; obtaining an average channel quality indicator by averaging the received quality over a transmission bandwidth, and generating feedback information by quantizing the obtained average channel quality indicator by a smaller number of quantization bits when the transmission bandwidth is wider; and transmitting the feedback information.

The feedback method of the present invention includes: receiving pilot signals transmitted from a plurality of antennas, via a plurality of antennas; estimating received quality of a received signal for each stream, using the received pilot signals; obtaining an average channel quality indicator by averaging the received quality of each stream over a transmission bandwidth; generating feedback information by quantizing the obtained average channel quality indicator of each stream by a smaller number of quantization bits when the transmission bandwidth is wider; and transmitting the feedback information.

Advantageous Effects of Invention

According to the present invention, even in a case where a transmission bandwidth varies, it is possible to equally secure the accuracy of average CQI feedback.

BRIEF DESCRIPTION OF DRAWINGS

FIG. 5 shows a feedback table according to Embodiment 1 of the present invention;

FIG. 9 shows a feedback table according to Embodiment 2 of the present invention.

DESCRIPTION OF EMBODIMENTS

Now, embodiments of the present invention will be described in detail with reference to the accompanying drawings.

Embodiment 1

Figure 1:
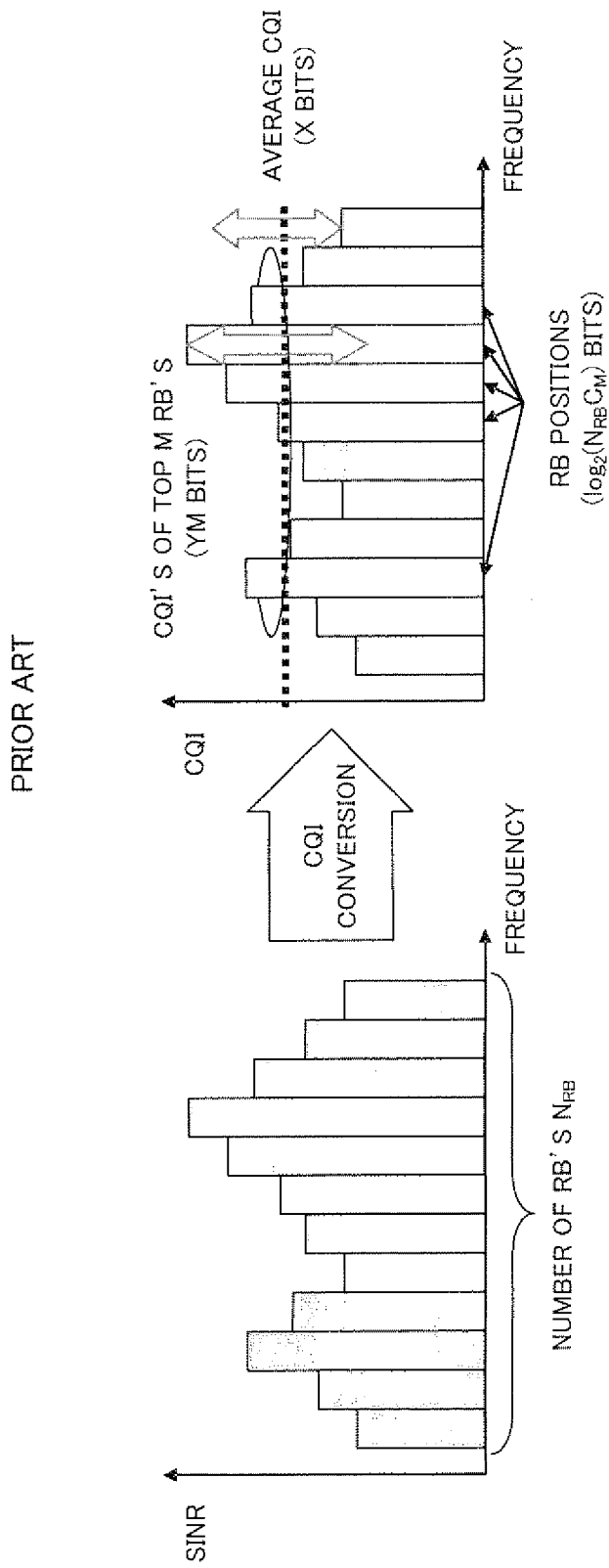
FIG. 1 shows an overview of Best-M reporting.
Figure 2:
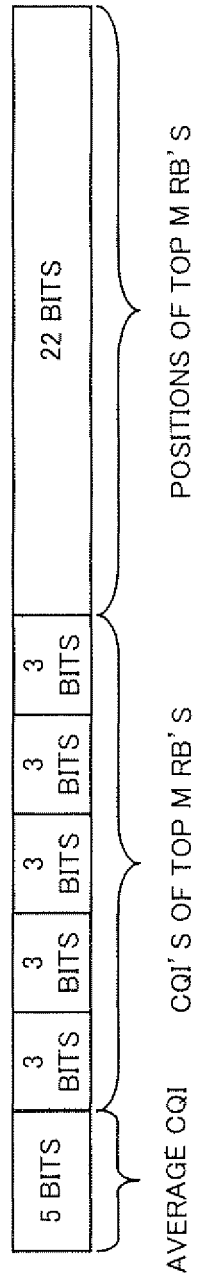
FIG. 2 shows a CQI feedback format according to Best-M reporting.
Figure 3A:
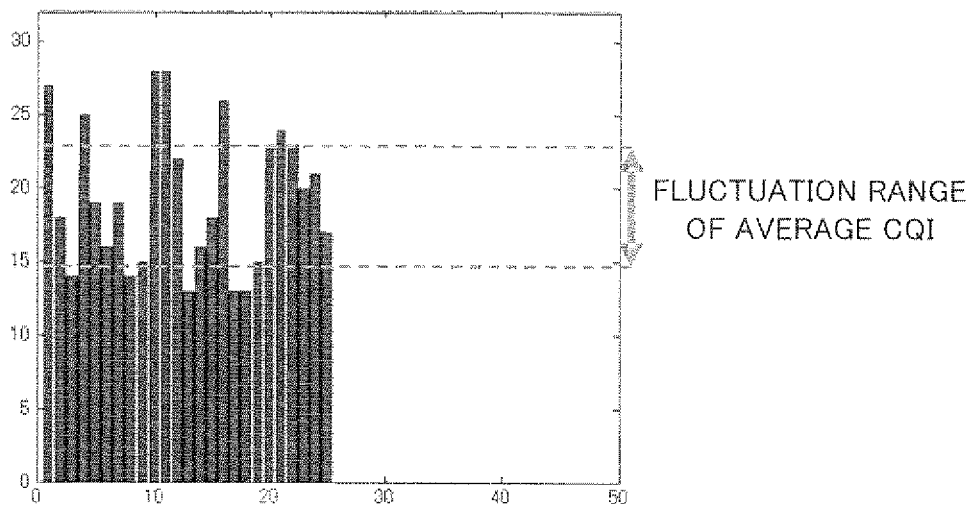
FIG. 3 shows relationships between transmission bandwidths and the average CQI fluctuation range.
Figure 3B:
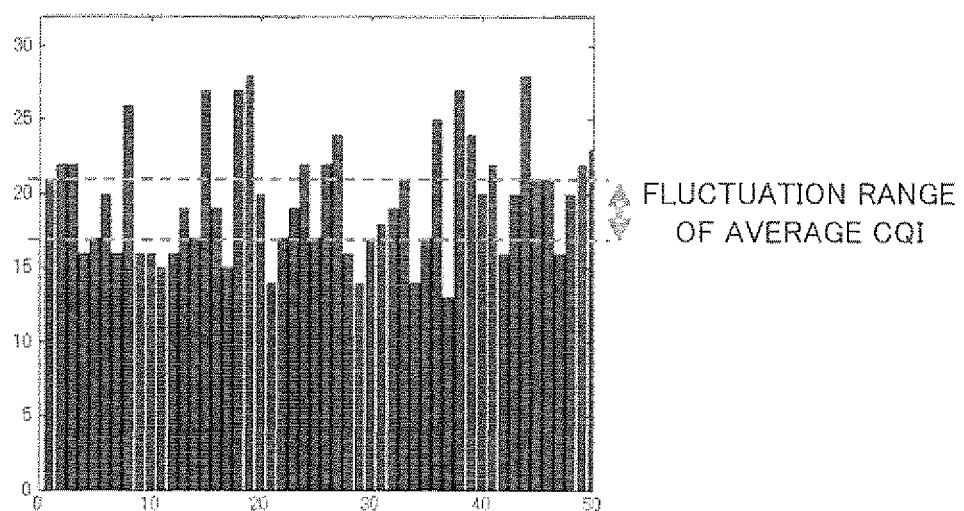
Figure 4:
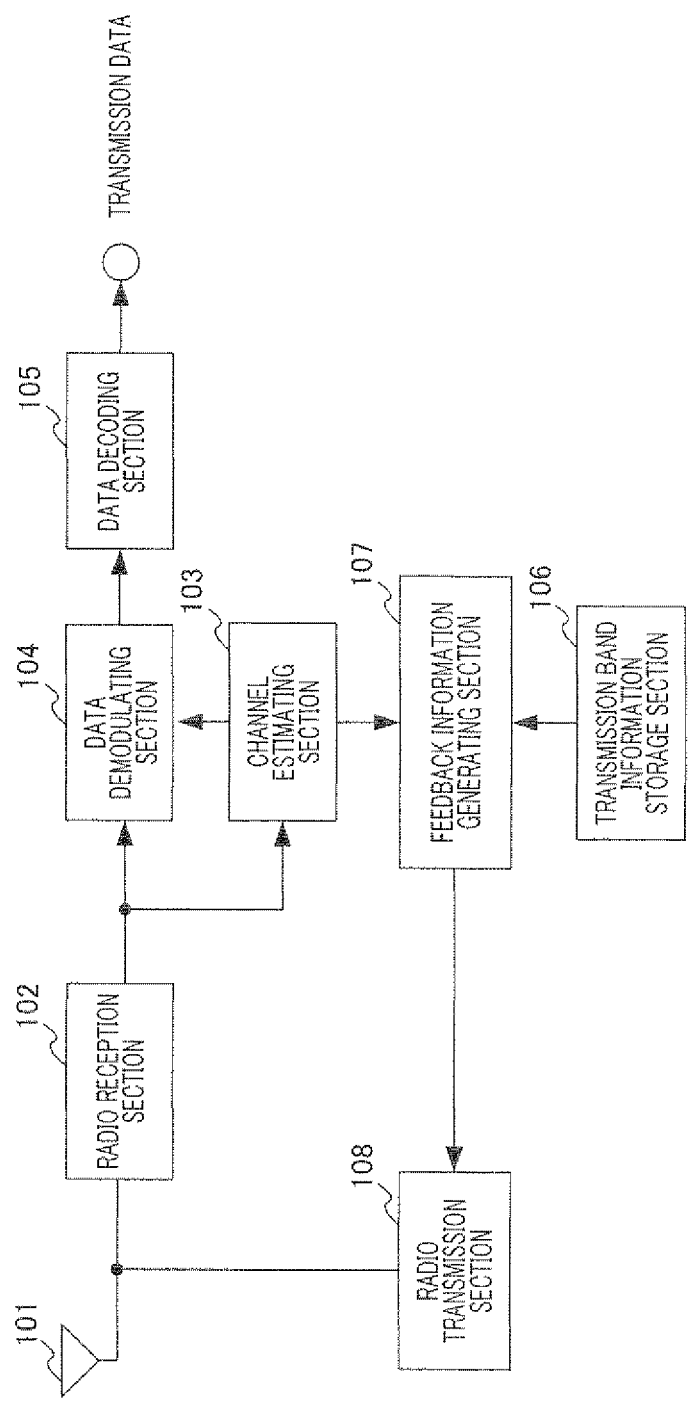
FIG. 4 is a block diagram showing the configuration of a reception apparatus according to Embodiment 1 of the present invention.

FIG. 4 is a block diagram showing the configuration of a reception apparatus according to Embodiment 1 of the present invention. Radio reception section 102 down-converts a signal received via antenna 101 to a baseband signal, outputs the pilot signal in the received signal to channel estimating section 103, and outputs the data signal in the received signal to data demodulating section 104.

Channel estimating section 103 obtains the channel estimation value and SINR for each RB, using the pilot signal outputted from radio reception section 102, and outputs the obtained channel estimation value to data demodulating section 104 and the SINR to feedback information generating section 107.

Data demodulating section 104 corrects the phase distortion of the data signal outputted from radio reception section 102 using the channel estimation value outputted from channel estimating section 103, converts the modulation symbol of the corrected phase distortion to soft decision bits, and outputs these bits to data decoding section 105. Data decoding section 105 decodes the soft decision bits outputted from data decoding section 104 and restores transmission data.

Transmission band information storage section 106 stores a transmission bandwidth assigned to the subject apparatus and reports the stored transmission bandwidth to feedback information generating section 107. The transmission bandwidth is reported by, for example, a broadcast channel.

Feedback information generating section 107 converts the SINR of each RB outputted from channel estimating section 103, to a corresponding CQI. Further, feedback information generating section 107 generates feedback information by the number of quantization bits determined based on the transmission bandwidth reported from transmission band information storage section 106, and outputs this information to radio transmission section 108. Feedback information generating section 107 will be described later in detail.

Radio transmission section 108 up-converts the feedback information outputted from feedback information generating section 107 and transmits the result from antenna 101.

Next, generation of feedback information in above feedback information generating section 107 will be explained in detail. Assume that feedback information generating section 107 has a feedback table as shown in FIG. 5. In this feedback table, number of quantization bits X for an average CQI is reduced when the transmission bandwidth is wider. Here, assume that the number of quantization bits is equal in 20 MHz (100 RB's) or more.

In FIG. 5, five bits are provided for the average CQI in 5 MHz (25 RB's), four bits are provided for the average CQI in 10 MHz (50 RB's), three bits are provided for the average CQI in 20 MHz (100 RB's) and three bits are provided for the average CQI in 40 MHz (200 RB's). These values are set because, since the number of samples (the number of RB's in this case) to be averaged increases when the transmission bandwidth is wider, the frequency diversity effect increases and the average CQI fluctuation range becomes small. Here, number of CQI's M to feed back is five and number of quantization bits Y of top M CQI's is three bits.

Figure 6:
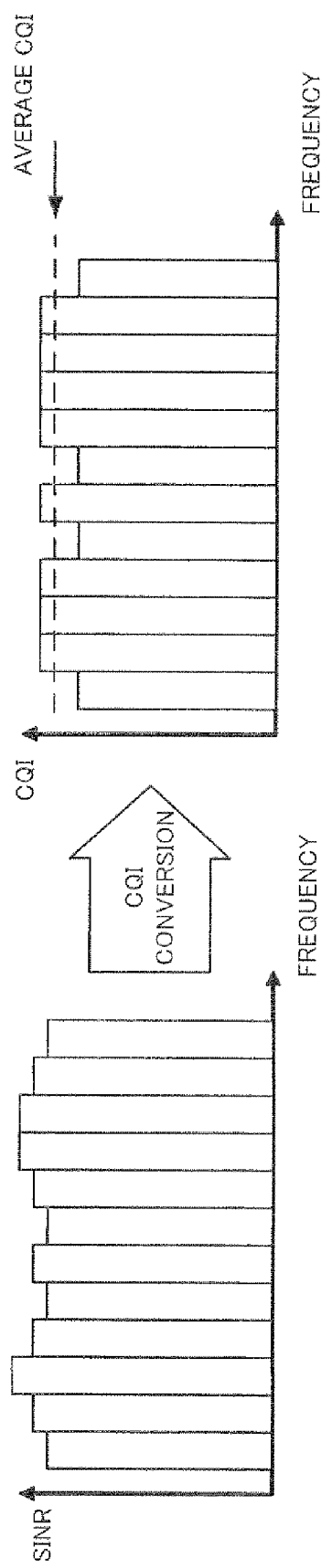
FIG. 6 shows a state where SINR's are converted to CQI's.

As shown in FIG. 6, feedback information generating section 107 converts SINR's averaged per RB to CQI's, according to the numbers of quantization bits in the feedback table shown in FIG. 5. Also, feedback information generating section 107 obtains the average SINR in the entire transmission band from the SINR per RB, and performs CQI conversion of the average SINR according to the numbers of quantization bits in the feedback table of FIG. 5. Then, feedback information is generated.

Figure 7:
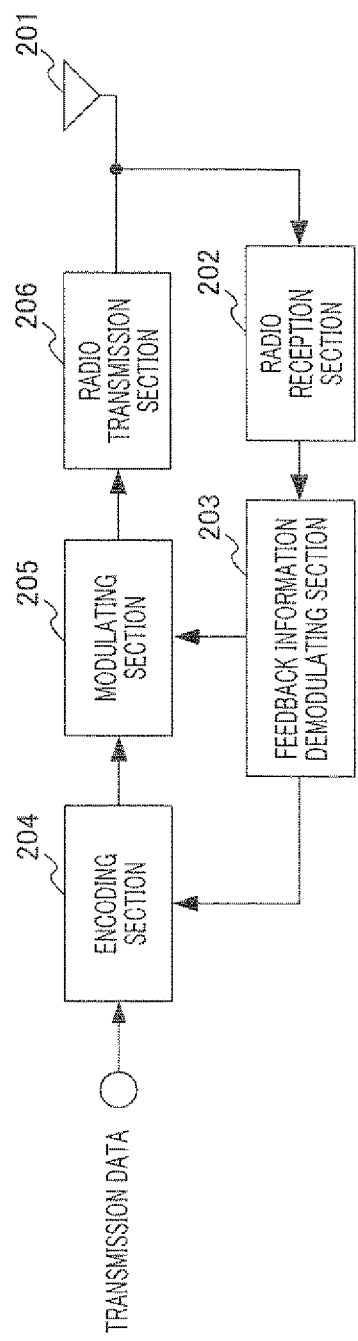
FIG. 7 is a block diagram showing the configuration of a transmission apparatus according to Embodiment 1 of the present invention.

FIG. 7 is a block diagram showing the configuration of a transmission apparatus according to Embodiment 1 of the present invention. Radio reception section 202 receives feedback information fed back from the reception apparatus via antenna 201, down-converts the received feedback information to a baseband signal and outputs this signal to feedback information demodulating section 203.

Feedback information demodulating section 203 has the same feedback table as the feedback table provided in feedback information generating section 107 of the reception apparatus shown in FIG. 4, demodulates the feedback information outputted from radio reception section 202 based on the feedback table and obtains a CQI (channel coding rate and modulation level). Here, feedback information demodulating section 203 has transmission bandwidth information assigned to the communicating reception apparatus. The obtained channel coding rate is outputted to encoding section 204, and the modulation level is outputted to modulating section 205. Feedback information demodulating section 203 will be described later in detail.

Encoding section 204 encodes each input transmission data by the channel coding rate outputted from feedback information demodulating section 203, and outputs encoded data to modulating section 205. Modulating section 205 modulates the encoded data outputted from encoding section 204 by the modulation level outputted from feedback information demodulating section 203, and outputs the modulation symbol to radio transmission section 206.

Radio transmission section 206 up-converts the modulation symbol outputted from modulating section 205 and transmits the result from antenna 201.

Next, demodulation of feedback information in above feedback information demodulating section 203 will be explained in detail. Feedback information demodulating section 203 has the feedback table shown in FIG. 5.

The number of quantization bits for an average CQI varies between transmission bandwidths. Consequently, with reference to the feedback table, feedback information demodulating section 203 obtains number of quantization bits X for the average CQI, number of CQI's M to feed back, and number of quantization bits Y for the CQI's, according to transmission bandwidth information shared between the reception apparatus and the transmission apparatus. Feedback information demodulating section 203 demodulates feedback information based on obtained X, M and Y, and obtains a transmission weight and CQI (channel coding rate and modulation level). According to the feedback table shown in FIG. 5, X=3 to 5, M=5 and Y=3.

Thus, according to Embodiment 1, by reducing the number of quantization bits for an average CQI when the transmission bandwidth is wider, the number of quantization bits is decreased when the fluctuation range of the average CQI is narrower, so that, regardless of the transmission bandwidth, it is possible to equally secure the accuracy of average CQI feedback. Further, it is possible to reduce the amount of feedback.

Embodiment 2

Although a case of SISO (Single Input Single Output) has been described with Embodiment 1, a case of MIMO (Multiple Input Multiple Output) will be explained with Embodiment 2 of the present invention.

Figure 8:
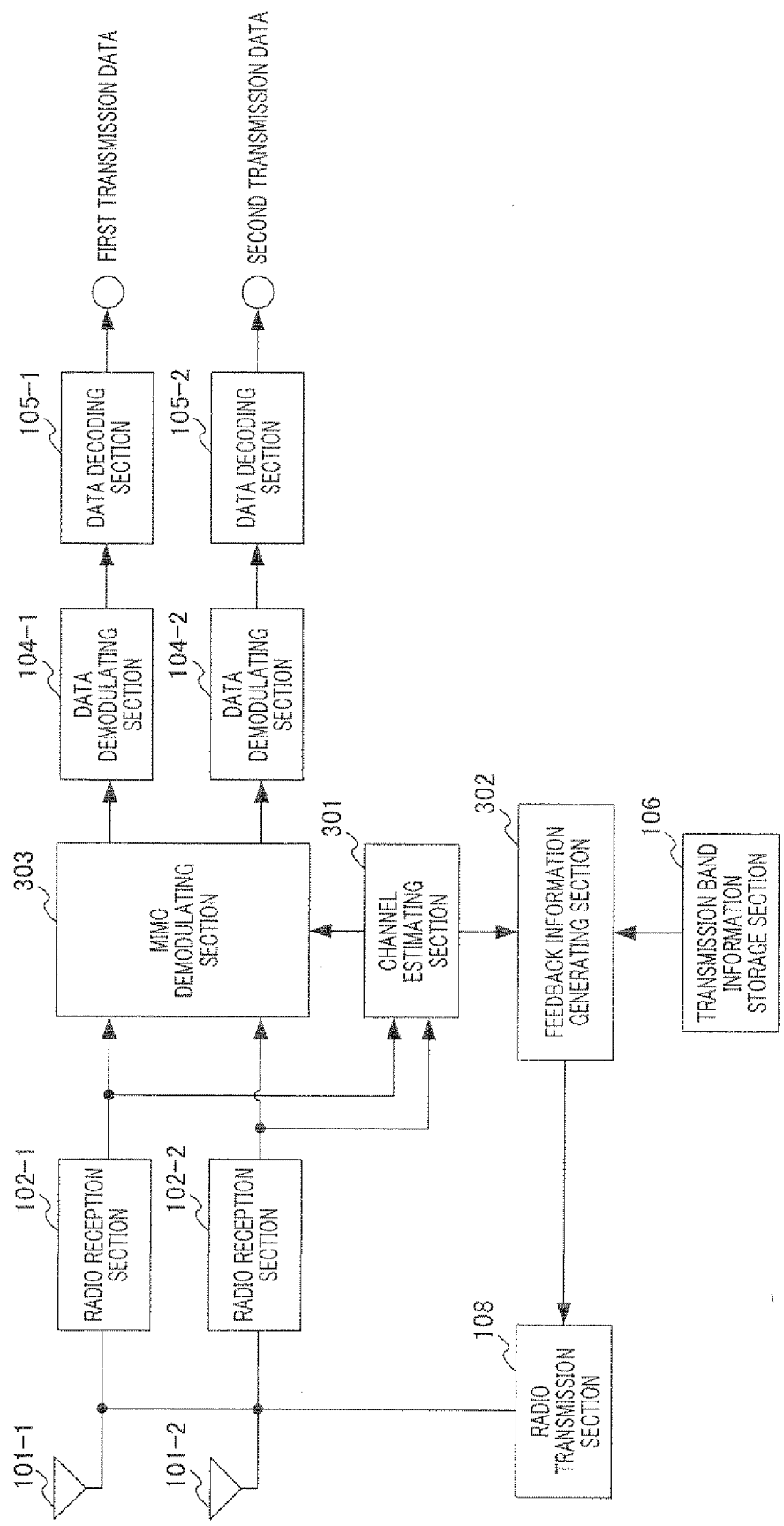
FIG. 8 is a block diagram showing the configuration of a reception apparatus according to Embodiment 2 of the present invention.

FIG. 8 is a block diagram showing the configuration of a reception apparatus according to Embodiment 2 of the present invention. Here, a case will be explained where two antennas are provided. However, the same components as in FIG. 4 of Embodiment 1 will be assigned the same reference numerals as in FIG. 4, and overlapping explanation will be omitted. Here, when blocks having the same function overlap by providing two antennas, although branch numbers are assigned to these blocks, there is no difference between these branch numbers unless explained otherwise.

Radio reception sections 102-1 and 102-2 down-convert signals received via corresponding antennas 101-1 and 101-2 to baseband signals, output data signals in the received signals to MIMO demodulating section 303, and output pilot signals in the received signals to channel estimating section 301.

Channel estimating section 301 obtains the channel estimation value and SINR per RB in each stream, using the pilot signals outputted from radio reception sections 102-1 and 102-2, and outputs the obtained SINR to feedback information generating section 302 and the channel estimation value to MIMO demodulating section 303.

Feedback information generating section 302 converts the SINR per RB outputted from channel estimating section 301, to the CQI corresponding to each stream. Further, feedback information generating section 302 generates CQI feedback information by the number of quantization bits determined based on a transmission bandwidth reported from transmission band information storage section 106, and outputs this information to radio transmission section 108. Feedback information generating section 302 will be described later in detail.

MIMO demodulating section 303 demultiplexes the data signals outputted from radio reception sections 102-1 and 102-2 for each stream, using the channel estimation values outputted from channel estimating section 301. The demultiplexed streams are outputted to data demodulating sections 104-1 and 104-2, respectively.

Next, generation of feedback information in above feedback information generating section 302 will be explained in detail. As shown in FIG. 9, feedback information generating section 302 has a feedback bit table in which, as for the first stream, number of quantization bits X for the average CQI is reduced when the transmission bandwidth is wider, and in which, as for a second stream, the average CQI is represented by the difference from the average CQI in the first stream and number of bits Xd representing the difference is reduced when the transmission bandwidth is wider. Here, the same number of quantization bits is provided for the average CQI in the first stream in 20 MHz (100 RB's) or more, and 0 bit is provided for the average CQI in the second stream in 20 MHz (100 RB's).

In FIG. 9, as for the first stream, five bits are provided for the average CQI in 5 MHz (25 RB's), four bits are provided for the average CQI in 10 MHz (50 RB's), three bits are provided for the average CQI in 20 MHz (100 RB's), and three bits are provided for the average CQI in 40 MHz (200 RB's). Also, as for the second stream, three bits are provided for the difference in 5 MHz (25 RB's), and two bits are provided for the difference in 10 MHz (50 RB's). These values are set because, since the number of samples (the number of RB's in this case) to be averaged increases when the transmission bandwidth is wider, the frequency diversity effect improves and the difference between average CQI's in streams becomes small. Here, number of CQI's M to feed back is five and number of quantization bits Y of top M CQI's is three bits.

Based on the feedback table shown in FIG. 9, feedback information generating section 302 obtains the number of quantization bits for the average CQI in the first stream based on the transmission bandwidth and obtains the number of quantization bits for the difference in the second stream based on the transmission bandwidth. Further, for each stream, feedback information generating section 302 obtains the average SINR in the entire transmission band from the SINR per RB, and converts the average SINR and SINR's of top M RB's to CQI's by the obtained number of quantization bits. Then, feedback information is generated.

Figure 10:
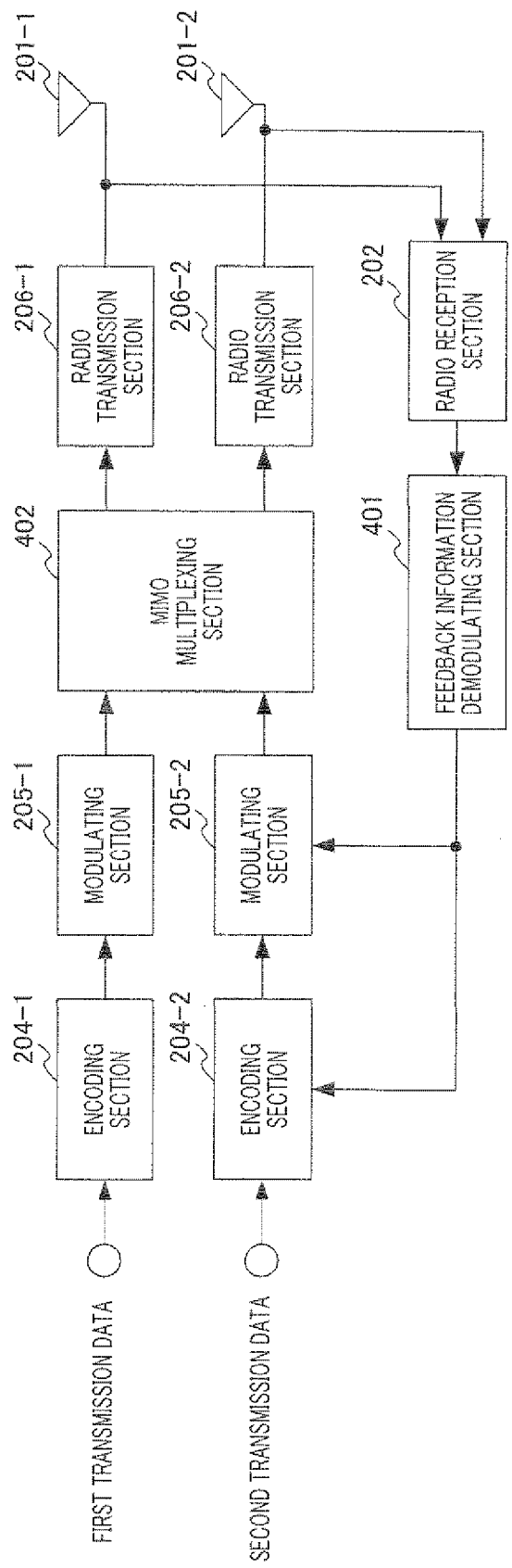
FIG. 10 is a block diagram showing the configuration of a transmission apparatus according to Embodiment 2 of the present invention.

FIG. 10 is a block diagram showing the configuration of a transmission apparatus according to Embodiment 2 of the present invention. Here, a case will be explained where two antennas 201-1 and 201-2 are provided. However, the same components as in FIG. 7 of Embodiment 1 will be assigned the same reference numerals as in FIG. 7, and overlapping explanation will be omitted. Here, when blocks having the same function overlap by providing two antennas, although branch numbers are assigned to these blocks, there is no difference between these branch numbers unless explained otherwise.

Feedback, information demodulating section 401 has the same feedback bit table as the feedback bit table provided in feedback information generating section 302 of the reception apparatus shown in FIG. 8, demodulates feedback information outputted from radio reception section 202 based on the feedback table, and obtains transmission weights and CQI's (channel coding rates and modulation levels). The obtained channel coding rates are outputted to encoding sections 204-1 and 204-2, and the modulation levels are outputted to modulating sections 205-1 and 205-2. Also, feedback information demodulating section 401 will be described later in detail.

MIMO multiplexing section 402 converts modulation symbols outputted from modulating sections 205-1 and 205-2 to transmission streams, multiplexes all transmission streams and outputs the result to radio transmission sections 206-1 and 206-2.

Next, demodulation of feedback information in above feedback information demodulating section 401 will be explained in detail. Feedback information demodulating section 401 has the feedback bit table shown in FIG. 9.

The number of quantization bits for the average CQI in each stream varies between transmission bandwidths. Consequently, with reference to the feedback table, feedback information demodulating section 401 obtains number of quantization bits X for the average CQI in the first stream, number of quantization bits Xd for the difference in the second stream, number of CQI's M to feed back, and number of quantization bits Y for the CQI's. Feedback information demodulating section 401 demodulates feedback information based on the number of quantization bits obtained, and obtains transmission weights and CQI's (channel coding rates and modulation levels).

Thus, according to Embodiment 2, by reducing the number of quantization bits for an average CQI when the transmission bandwidth is wider, the number of quantization bits is decreased when the average CQI fluctuation range is narrower, so that, regardless of the transmission bandwidth, it is possible to equally secure the accuracy of average CQI feedback. Further, it is possible to reduce the amount of feedback.

Also, although a case has been described above with the present embodiment where the number of antennas is two, the present invention is not limited by the number of antennas.

Also, cases have been described above with embodiments where the reception apparatus receives and obtains a broadcast channel including transmission bandwidth information as a method of obtaining a transmission bandwidth. However, in a system in which the transmission bandwidth is variable during communication, it may be possible to obtain the transmission bandwidth by a control channel in shorter transmission intervals (10 msec or below). Also, in a system in which the transmission bandwidth is determined in advance between the transmission apparatus and the reception apparatus, reporting by signaling is not particularly necessary.

Also, although cases have been described with embodiments where Best-M reporting is used as an example of a CQI feedback method and an average CQI is used as an index to represent the quality of the entire transmission band, the present invention is not limited to this. For example, it is equally possible to use DCT reporting as a CQI feedback method and use a DC component as an index to represent the quality of the entire transmission band.

Also, although cases have been described above with embodiments where the number of RB's (i.e. the number of samples to represent channel quality) increases when the transmission bandwidth is wider, it is equally possible to change the number of RB's even when the transmission band is fixed. For example, it may be possible to group a plurality of RB's and change the number of samples in the entire transmission band.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although the present invention has been described above with embodiments using antennas, the present invention is equally applicable to antenna ports.

An antenna port refers to a theoretical antenna comprised of one or a plurality of physical antennas. That is, an antenna port does not necessarily represent one physical antenna, and may represent an array antenna comprised of a plurality of antennas.

For example, 3 GPP LTE does not define how many physical antennas an antenna port is formed with, but defines that an antenna port is the minimum unit for transmitting different reference signals in a base station.

Also, an antenna port may be defined as the minimum unit upon multiplication of weighting of a precoding vector.

INDUSTRIAL APPLICABILITY

The radio reception apparatus, radio transmission apparatus and feedback method according to the present invention are applicable to, for example, a mobile communication system.

The invention claimed is:

1. A radio reception apparatus comprising:
a reception section that receives a pilot signal;
an estimating section that estimates received quality of a received signal using the received pilot signal;
a feedback information generating section that obtains an average channel quality indicator by averaging the received quality over a transmission bandwidth, and generates feedback information by quantizing the obtained average channel quality indicator by a smaller number of quantization bits when the transmission bandwidth is wider; and
a transmission section that transmits the feedback information.

2. The radio reception apparatus according to claim 1, wherein the feedback information generating section makes a reduction range of the number of quantization bits smaller when the transmission bandwidth is wider.

3. A radio transmission apparatus comprising:
a reception section that receives feedback information including an average channel quality indicator obtained by averaging received quality over a transmission bandwidth; and
a feedback information demodulating section that demodulates the feedback information based on a smaller number of quantization bits when the transmission bandwidth is wider.

4. A radio reception apparatus comprising:
a reception section that receives pilot signals transmitted from a plurality of antennas, via a plurality of antennas;

an estimating section that estimates received quality of a received signal for each stream, using the received pilot signals;

a feedback information generating section that obtains an average channel quality indicator by averaging the received quality of each stream over a transmission bandwidth, and generates feedback information by quantizing the obtained average channel quality indicator of each stream by a smaller number of quantization bits when the transmission bandwidth is wider; and a transmission section that transmits the feedback information.

5. The radio reception apparatus according to claim 4, wherein the feedback information generating section expresses an average channel quality indicator of a second stream or later by a difference from an average channel quality indicator of a first stream, and quantizes the difference by a smaller number of quantization bits when the transmission bandwidth is wider.

6. The radio reception apparatus according to claim 5, wherein the feedback information generating section makes a reduction range of the number of quantization bits to quantize the difference, smaller when the transmission band width is wider.

7. A radio transmission apparatus comprising:

a reception section that receives feedback information including an average channel quality indicator of each stream obtained by averaging received quality of each stream over a transmission bandwidth; and a feedback information demodulating section that demodulates the feedback information based on a smaller number of quantization bits when the transmission bandwidth is wider.

8. A feedback method comprising:

receiving a pilot signal;

estimating received quality of a received signal using the received pilot signal;

obtaining an average channel quality indicator by averaging the received quality over a transmission bandwidth, generating feedback information by quantizing the obtained average channel quality indicator by a smaller number of quantization bits when the transmission bandwidth is wider; and transmitting the feedback information.

9. A feedback method comprising:

receiving pilot signals transmitted from a plurality of antennas, via a plurality of antennas;

estimating received quality of a received signal for each stream, using the received pilot signals;

obtaining an average channel quality indicator by averaging the received quality of each stream over a transmission bandwidth;

generating feedback information by quantizing the obtained average channel quality indicator of each stream by a smaller number of quantization bits when the transmission bandwidth is wider; and transmitting the feedback information.

* * * * *